United States Patent Office 2,947,743
Patented Aug. 2, 1960

2,947,743

$N^4$-AMINOACETYL-, $N^4$-LOWER ALKYLAMINO-ACETYL- AND $N^4$-DI-LOWER ALKYLAMINO-ACETYL-6-SULFANILAMIDO-2,4-DIMETHOXY-PYRIMIDINES

Max Hoffer, Nutley, N.J., assignor to Hoffmann-La Roche Inc., Nutley, N.J., a corporation of New Jersey No Drawing. Filed May 12, 1959, Ser. No. 812,588

7 Claims. (Cl. 260—239.75)

This invention relates to $N^4$-[($R^1,R^2$-amino)acetyl]-6-sulfanilamido-2,4-dimethoxypyrimidines and acid addition salts thereof. $R^1$ and $R^2$ represent hydrogen or lower alkyl groups such as methyl, ethyl, propyl, isopropyl, butyl and the like. Preferred in this class are the compounds $N^4$-aminoacetyl-6-sulfanilamido-2,4 - dimethoxypyrimidine, $N^4$-methylaminoacetyl -6- sulfanilamido-2,4-dimethoxypyrimidine and $N^4$-dimethylaminoacetyl-6-sulfanilamido-2,4-dimethoxypyrimidine.

The $N^4$-[($R^1,R^2$-amino)acetyl]-6-sulfanilamido-2,4-dimethoxypyrimidines of this invention form acid addition salts which are also part of this invention. The basic compounds react with inorganic and organic acids to form salts, most of which are relatively water soluble, such as the hydrohalides, e.g. hydrochloride, hydrobromide, hydroiodide, etc., other mineral acid salts such as sulfate, nitrate, phosphate, alkyl- and aralkylsulfonates, such as ethanesulfonate, benzenesulfonate, toluenesulfonate, etc., and other organic acid salts such as citrate, ascorbate, mandelate, salicylate, tartrate, acetate, etc.

The compounds of this invention are useful as antibacterial agents to combat infections caused by both gram positive and gram negative bacteria such as pneumococci, streptococci, staphylococci, salmonella, coliform, etc. Contrary to the usual experience that acylation of sulfonamides in the $N^4$-position results in disappearance of antibacterial activity, it has been found that the compounds of this invention are highly active against the organisms named. The compounds may be administered orally or parenterally by incorporating therapeutic dosages of the basic compound or medicinally acceptable salts thereof in conventional solid or liquid dosage forms, such as tablets, capsules, injectables, etc., preferably water soluble salts in the case of injectables, together with conventional solid or liquid carriers therefor.

The products of this invention are produced by reacting 6-sulfanilamido-2,4-dimethoxypyrimidine with chloracetyl chloride to first obtain $N^4$-chloracetyl -6-sulfanilamido-2,4-dimethoxypyrimidine. Preferably the pyrimidine is dissolved in aqueous acid solution, e.g. aqueous mineral acids, and the chloracetyl chloride is added at a low temperature, e.g. 5 to 10° C. The product of this reaction is then reacted with ammonia, a lower alkylamine, such as methylamine, ethylamine, etc., or a di-lower alkylamine, such as dimethylamine, in aqueous or alcoholic medium at room temperature or above. The end product may be isolated by evaporating the ammonia or alkylamine or by neutralizing with acid. It is frequently convenient to first produce a readily crystallizable salt, e.g. the hydrochloride, and then neutralize with a base, e.g. an alkali metal hydroxide, as a means of obtaining a pure product.

As an alternate method of synthesis, aniline may be reacted with chloracetyl chloride to form p-chloracetanilide. The chloracetanilide is then treated with chlorosulfonic acid to form p-chloracetylamino-benzenesulfonyl chloride which in turn is reacted with 6-amino-2,4-dimethoxypyrimidine to obtain $N^4$-chloracetyl-6-sulfanilamido-2,4-dimethoxypyrimidine. The last named compound is then treated with aqueous ammonia or alkylamine as described above.

A further alternative comprises reacting 2,4-dimethoxypyrimidyl trimethylammonium chloride with an alkali metal salt of $N^4$-aminoacetylsulfanilamide, $N^4$-alkylaminoacetylsulfanilamide or $N^4$-dialkylaminoacetylsulfanilamide.

The following examples are illustrative of the invention. All temperatures are expressed in degrees centigrade.

Example 1

62 g. of 6-sulfanilamido-2,4-dimethoxypyrimidine were dissolved in 600 ml. of 3 N aqueous hydrochloric acid. The solution was cooled in an ice bath to 5–10° and 25 g. of chloracetyl chloride were dropped into the stirred mixture at 5–10° over a period of 20–30 minutes. The reaction product separated as a voluminous crystalline precipitate, which, in this form, proved hard to filter. Upon addition of 600 ml. of hot water so that the temperature rose to 50–60°, the precipitate turned rapidly into a sandy, white powder which was easy to filter and to wash. The powder was filtered under suction, washed with water and dried at 70°. The product, $N^4$-chloracetyl-6-sulfanilamido - 2,4 - dimethoxyprimidine melted at 187°.

38.7 g. of $N^4$-chloracetyl-6-sulfanilamido-2,4-dimethoxypyrimidine were dissolved in 300 ml. of 25% aqueous ammonia. The solution was allowed to stand for 24 hours. The ammonia was then evaporated under vacuum. During the evaporation, the reaction product crystallized and it was then filtered under suction. The filtrate was evaporated twice more to give two additional crops of product. The white, crystalline product, $N^4$-aminoacetyl - 6 - sulfanilamido - 2,4-dimethoxypyrimidine, was recrystallized from 60% ethanol, M.P. 231–233°.

A portion of the product obtained above was dissolved in 3N aqueous hydrochloric acid and chilled. Upon addition of ethanol, $N^4$-aminoacetyl-6-sulfanilamido-2,4-dimethoxypyrimidine hydrochloride precipitated in crystalline form and was isolated by filtration.

The soluble citrate salt of $N^4$-aminoacetyl-6-sulfanilamido-2,4-dimethoxypyrimidine was produced by dissolving 2.1 g. of citric acid and 3.67 g. of $N^4$-aminoacetyl-6-sulfanilamido-2,4-dimethoxypyrimidine in 20 ml. of hot water. The solution was filtered and water was added to a volume of 31 ml. to obtain a 11.82% aqueous solution of $N^4$-aminoacetyl-6-sulfanilamido-2,4-dimethoxypyrimidine citrate.

Example 2

38.7 g. of $N^4$-chloracetyl-6-sulfanilamido-2,4-dimethoxypyrimidine were dissolved in 200 ml. of 25% aqueous methylamine solution and the solution was allowed to stand for 24 hours. It was then evaporated under vacuum. The reaction product, $N^4$-methylaminoacetyl-6-sulfanilamido-2,4-dimethoxypyrimidine, crystallized and was filtered under suction. The product was purified by slurrying the crude with 50 ml. of 3 N aqueous hydrochloric acid and precipitating $N^4$-methylaminoacetyl-6-sulfanilamido-2,4-dimethoxypyrimidine hydrochloride by the addition of about 300 ml. of alcohol. The hydrochloride was then filtered under suction.

The hydrochloride obtained above was dissolved in about 300 ml. of hot water and charcoal was added to the solution. The mixture was filtered. The filtrate was neutralized with ammonia to obtain again $N^4$-methylaminoacetyl - 6 - sulfanilamido-2,4-dimethoxypyrimidine. This product was separated by filtration and washed with water. Upon drying, it melted at 226–228°.

Example 3

20 g. of $N^4$-chloracetyl-6-sulfanilamido-2,4-dimethoxypyrimidine were dissolved in 100 ml. of aqueous 25% dimethylamine and the solution was allowed to stand at 25–50° for 24 hours. Charcoal was added to the solution and it was then filtered. The filtrate was neutralized with acetic acid. The product, $N^4$-dimethylaminoacetyl-6-sulfanilamido-2,4-dimethoxypyrimidine, precipitated in crystalline form. Upon recrystallization from dilute ethanol, the product melted at 201–202°.

3.95 g. of $N^4$-dimethylaminoacetyl-6-sulfanilamido-2,4-dimethoxypyrimidine were dissolved in 10 ml. of 1 N aqueous hydrochloric acid. The solution was filtered and water was added to a volume of 31 ml. A 12.72% aqueous solution of soluble $N^4$-dimethylaminoacetyl-6-sulfanilamido-2,4-dimethoxypyrimidine hydrochloride was thus obtained.

I claim:

1. A compound of the group consisting of $N^4$-[($R^1$,$R^2$-amino)-acetyl]-6-sulfanilamido-2,4-dimethoxypyrimidine, wherein $R^1$ and $R^2$ each represents a member of the group consisting of hydrogen and lower alkyl, and medicinally acceptable acid addition salts thereof.

2. $N^4$ - aminoacetyl - 6 - sulfanilamido - 2,4-dimethoxypyrimidine.

3. $N^4$ - lower alkylaminoacetyl-6-sulfanilamido-2,4-dimethoxypyrimidine.

4. $N^4$-di-lower alkylaminoacetyl-6-sulfanilamido-2,4-dimethoxypyrimidine.

5. $N^4$ - methylaminoacetyl-6-sulfanilamido-2,4-dimethoxypyrimidine.

6. $N^4$-dimethylaminoacetyl-6-sulfanilamido-2,4-dimethoxypyrimidine.

7. $N^4$ - chloracetyl - 6 - sulfanilamido-2,4-dimethoxypyrimidine.

References Cited in the file of this patent

FOREIGN PATENTS 599,967     Great Britain _____ Mar. 25, 1958